US00RE43890E

(19) United States
(12) Reissued Patent
Li et al.

(10) Patent Number: US RE43,890 E
(45) Date of Reissued Patent: Jan. 1, 2013

(54) LED LIGHT MODULE AND SERIES CONNECTED LIGHT MODULES

(75) Inventors: Mingzhu Li, Vancouver (CA); JingJing Yu, El Monte, CA (US)

(73) Assignee: 1 Energy Solutions, Inc., Agoura Hills, CA (US)

(21) Appl. No.: 13/267,737

(22) Filed: Oct. 6, 2011

Related U.S. Patent Documents

Reissue of:
(64) Patent No.: 7,045,965
Issued: May 16, 2006
Appl. No.: 10/767,820
Filed: Jan. 30, 2004

(51) Int. Cl.
*H05B 37/00* (2006.01)

(52) U.S. Cl. ..... 315/185 S; 315/200 A; 315/322; 315/291; 315/312; 362/800

(58) Field of Classification Search ..... 362/800–812; 315/185 S, 312–322, 209 R, 247, 291, 200 A
See application file for complete search history.

(56) References Cited

U.S. PATENT DOCUMENTS

| | | | | |
|---|---|---|---|---|
| 4,271,408 | A | 6/1981 | Teshima | |
| 4,298,869 | A | 11/1981 | Okuno | |
| 4,321,598 | A | 3/1982 | Warner | |
| 4,329,625 | A | 5/1982 | Nishizawa | |
| 4,367,471 | A | 1/1983 | Gillessen | |
| 4,675,575 | A | 6/1987 | Smith et al. | |
| 4,855,880 | A | 8/1989 | Mancusi, Jr. | |
| 4,870,547 | A | 9/1989 | Crucefix | |
| 4,939,426 | A | 7/1990 | Menard et al. | |
| 4,954,822 | A | 9/1990 | Borenstein | |
| 5,155,669 | A | 10/1992 | Yamuro | |
| 5,187,377 | A | 2/1993 | Katoh | |
| 5,404,282 | A * | 4/1995 | Klinke et al. | 362/249.06 |
| 5,463,280 | A | 10/1995 | Johnson | |
| 5,495,147 | A | 2/1996 | Lanzisera | |
| 5,663,719 | A | 9/1997 | Deese et al. | |
| 5,808,592 | A | 9/1998 | Mizutani et al. | |
| 5,936,599 | A | 8/1999 | Reymond | |
| 6,194,839 | B1 * | 2/2001 | Chang | 315/185 S |
| 6,344,716 | B1 | 2/2002 | Gibboney, Jr. | |
| 6,461,019 | B1 * | 10/2002 | Allen | 362/249.06 |
| 6,786,625 | B2 * | 9/2004 | Wesson | 362/545 |
| 2004/0042205 | A1 * | 3/2004 | Tanabe et al. | 362/189 |

OTHER PUBLICATIONS

James E. Kloeppel (217-244-1073 / kloeppel@uiuc.edu) "New light-emitting transistor could revolutionize electronics industry". Webpage "News Bureau: University of Illinois at Urbana-Champaign" (http://www.news.uiuc.edu/news/04/0105LET.html), University of Illinois at Urbana-Champaign, Urbana, Illinois.

* cited by examiner

*Primary Examiner* — Tuyet Thi Vo
(74) *Attorney, Agent, or Firm* — William W. Cochran; Cochran Freund & Young LLC

(57) ABSTRACT

A lighting module with improved reliability including a pair of LEDs connected in parallel and with the same polarity and a method for making the said light module are disclosed. The parallel LEDs with the same polarity will increase the reliability of the light module and make it suitable for use in light strings where a relatively large number of such light modules are connected in series and where the failure of one such light module will cause the failure of the entire light string. A light string made of such light modules and a method for making the light string are also disclosed.

15 Claims, 6 Drawing Sheets

LED LIGHT MODULE AND SERIES CONNECTED LIGHT MODULES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to light modules assembled from light emitting diodes ("LEDs") and to light stings assembled by connecting such light modules together.

2. Description of Related Art

LEDs are increasingly used as light sources in various applications. Some of the features that make LEDs attractive include: low power consumption, long lifespan, low heat generation, small size and weight, robustness, fast switching time and availability in a variety of colors. In addition, in recent years, the cost of making LEDs has significantly decreased, making their use more economical, even in cost-sensitive applications.

One application where LEDs have become particularly popular in recent times has been household and decorative light strings. Such strings are typically formed from between fifty and one hundred LEDs connected together in series. The low power consumption and low heat generation of LEDs make them particularly suitable for such applications, where the cost of power and fire hazard make other types of light such as incandescent lights less attractive.

Nevertheless, there are problems with such strings. Despite their robustness, LEDs do sometimes fail. In the event of failure, the whole light string will go dark, which result is both unattractive and challenging to troubleshoot. The user must then locate the one LED out of fifty or one hundred that is faulty.

In a competing product, strings of incandescent lamps, a popular solution to this problem has been to connect all of the lamps together in parallel to form a string When a lamp in such a parallel circuit fails, the rest of the lamps continue to shine and the defective one is easy to identify and replace.

However, parallel circuitry has not been embraced with LED strings. In contrast to incandescent bulbs that can be built with a filament resistance suitable for parallel connection to a source of alternating current, LEDs are confined by their semiconductor properties to having a forward voltage drop typically in the neighborhood of 1.1 to 3.0 volts. As a result, unless voltage-reduction circuitry is in a light string, a large number of LEDs must be connected together in series to produce a total voltage drop equal to the voltage at which the alternating current is supplied, being 110 $V_{AC}$ in North America. For this reason, complete series-strings of LEDs are sometimes connected together in parallel, but the LEDs themselves are connected together in series to form the string. Thus, there is redundancy between the strings and a user can quickly tell if a string is not working, but it is still a challenge to find the LED within a string that is responsible for a malfunction.

A second reason that parallel circuitry is not seen in LED strings is that there exists a widely held view in the electronic design community that it is bad practice to connect diodes together in parallel with the same polarity. This view is based on the concern that parallel diodes are not well-suited for carrying more current than a single diode can carry on its own, because unless all parallel diodes have identical forward voltage drops, the one with the lowest forward voltage drop will carry the most current, which will cause its temperature to increase, which will cause its forward voltage drop to decrease further, which will cause it to carry even more current until it perhaps fails. If the failing diode fails open, the other parallel diodes will then be forced to carry more current, until they possibly fail one by one. It is important to note nevertheless, that this view seems to have arisen in the context of power circuits that are tasked with delivering high currents through expensive power diodes. In contrast, LEDs typically have significantly less steep current versus voltage curves than other diodes and, consequently, it is less likely that connecting non-identical LEDs in parallel will give rise to significant current differentials and over-heating in one of the LEDs. Furthermore, for typical lower current applications in which LEDs are used, LEDs may be cheap enough to significantly over-specify their rated forward current.

Accordingly, what is needed is a way to provide redundancy in an LED light string, such that when an LED fails, the rest of the light string will still function and the failed LED may be identified without undue difficulty.

SUMMARY OF THE INVENTION

The present invention is directed to this need.

According to one aspect of the invention, there is provided a method creating illumination that includes connecting a first light emitting diode ("LED") and a second LED together in parallel and with the same polarity.

According to another aspect of the invention, there is provided an apparatus that includes a light module that has a first LED and a second LED connected to the first LED in parallel and with the same polarity. At least one of the first and second LEDs might have a maximum total current rating sufficient to carry all current conducted through the light module.

In one configuration, the first and second LEDs have dissimilar electrical characteristics, such that the first LED carries all of the current conducted through the light module while the second LED remains unused unless and until the first LED fails open. In an alternate configuration, the first and second LEDs have similar electrical characteristics, and in particular the first and second LEDs have substantially the same forward voltage drop over the operating range of the light module. To better achieve similar forward voltage drops, the first and second LEDs are thermally connected to a common heat sink. The apparatus might also have a light-diffuser covering the first and second LEDs.

The module might also have a third LED connected to the first and second LEDs in parallel but with opposite polarity and a fourth LED connected to the first and second LEDs in parallel but with opposite polarity.

The module could also be connected together in series with other similar modules to provide a string of such light modules. The actual number of light modules that are connected together in series would be selected such that the sum of the minimum operating voltage for each of the light modules is less than or equal to the voltage available to supply the apparatus. For example, the minimum operating voltage of a light module might be the greater of the minimum operating voltage of the first LED and the minimum operating voltage of the second LED. Furthermore, the number of light modules that are connected together in series would be selected such that the sum of the maximum operating voltage for each of the light modules is greater than or equal to the voltage available to supply the apparatus. For example, the maximum operating voltage of a light module might be the lesser of the maximum operating voltage of the first LED and the maximum operating voltage of the second LED.

The apparatus might also include a way of limiting the current flowing through the light module, for example a resistor connected in series with the light module.

According to another aspect of the invention, there is provided an apparatus that includes a light module having a first polarized photon-emitting semiconductor device ("PPESD") and a second PPESD connected to the first PPESD in parallel and with the same polarity. At least one of the first PPESD and the second PPESD might have a maximum total current rating sufficient to carry all current conducted through the light module.

In one configuration, the first and second PPESDs have dissimilar electrical characteristics, such that the first PPESD carries all of the current conducted through the light module while the second PPESD remains unused unless and until the first PPESD fails open. In an alternate configuration, the first and second PPESDs have substantially the same forward voltage drop over the operating range of the light module.

Further aspects and advantages of the present invention will become apparent upon considering the following drawings, description, and claims.

DESCRIPTION OF THE INVENTION

The invention will be more fully illustrated by way of a detailed description of specific exemplary embodiments in conjunction with the accompanying drawing figures, in which like reference numerals designate like parts throughout the various figures.

1. BRIEF DESCRIPTION OF THE DRAWINGS

2. DETAILED DESCRIPTION OF SPECIFIC EMBODIMENTS

Figure 1:
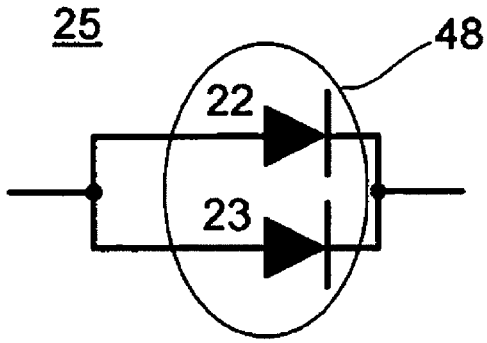
FIG. 1 is a schematic diagram of a light module according to a first embodiment of the invention.

FIG. 1 shows a light module according to one embodiment of the present invention, generally illustrated at 25. The light module 25 includes a pair of light emitting diodes ("LEDs") 22, 23 that are connected together in parallel and with the same polarity.

It is desirable that the pair of LEDs 22, 23 each has a maximum reverse voltage greater than the maximum voltage likely to be encountered in use. It is also desirable that the pair of LEDs 22, 23 each has a rated forward current greater than the maximum total current expected to flow through light module 25, so that in other words either of the pair of LEDs 22, 23 is capable of carrying the total current. In general, it is desirable that the pair of LEDs 22, 23 have substantially similar electrical characteristics; however, most particularly, it is desirable that the pair of LEDs 22, 23 each has the same or a substantially similar forward voltage drop over the typical range of operating conditions so as to reduce the likelihood that a significant difference in forward current will develop between the pair of LEDs 22, 23. In this sense, the term substantially similar means that in operation one of the pair of LEDs 22, 23 does not carry all or substantially all of the current flowing through the light module 25.

Besides taking care to select LEDs from a common production batch, there are many well-known design and assembly techniques for encouraging components to have similar electrical operating characteristics and it is understood that those would be used in the present case where applicable. For example, where temperature effects might be expected to influence the behavior of the pair of LEDs 22,23, the pair of LEDs 22, 23 could be thermally connected to a common heat sink 48.

If one of the pair of LEDs 22, 23 fails open, the other will still function and therefore the light module 25 will still illuminate. The remaining one of the pair of LEDs 23, 22 will carry the full current on its own. Furthermore, so long as it has been over-specified with a suitably high rated forward current it will continue to function properly. This LED-redundancy is inexpensive at these low current levels and because the pair of LEDs 22, 23 are connected in parallel to achieve redundancy rather than higher current carrying capacity, there is good reason for going against the conventional view that diodes should not be connected in parallel with the same polarity.

It will be appreciated that, even though it might be desirable for the pair of LEDs 22, 23 to be well-matched such that they both carry a share of the current conducted through the light module 25, this arrangement is not required for the invention to yield benefit. So long as each of the pair of LEDs 22, 23 is over-specified with a high enough rated forward current to carry the full current conducted through the light module 25, then improved redundancy is achieved even if one of the pair of LEDs 22, 23 conducted the full current before it failed open and thereafter the other one of the pair of LEDs 23, 22 conducted the full current. In fact, there may be a benefit to mismatching the pair of LEDs 22, 23, such that the first of the pair of LEDs 22, 23 is held in reserve while the second carries all the current conducted through the light module 25 until it fails open, at which point the fresh first of the pair of LEDs 22, 23 takes over carrying all of the current conducted through the light module 25. Those skilled in the art will appreciate that increased redundancy, and therefore reliability for the light module 25, may be obtained by connecting more than two LEDs in parallel and with the same polarity.

Figure 2:
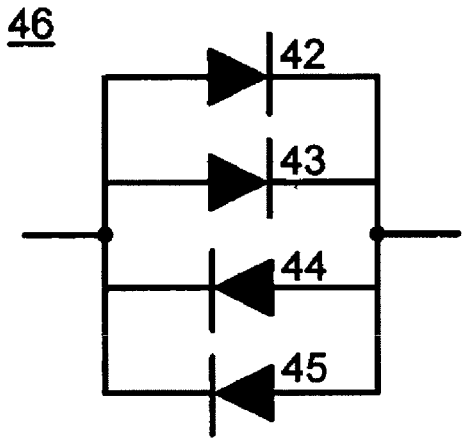
FIG. 2 is a schematic diagram of a second light module according to a second embodiment of the invention.

FIG. 2 shows a light module according to a second embodiment of the present invention, generally illustrated at 46. The light module 46 includes a first pair of LEDs 42, 43 that are connected in parallel and with the same polarity and a second pair of LEDs 44, 45 that are connected in parallel and with the same polarity, which is opposite to the polarity of the first pair of LEDs 42, 43.

Unlike the first embodiment light module 25, which is configured to provide illumination only when a source of electromotive force is applied to forward bias the pair of LEDs 22, 23, the second embodiment light module 46 is configured to provide illumination both when a source of electromotive force is applied to forward bias the first pair of LEDs 42, 43 and when a source of oppositely polarized electromotive force is applied to forward bias the second pair of LEDs 44, 45. Thus, when connected to a source of alternating current, the first embodiment light module 25 is configured to provide illumination during approximately half of the cycle of the source current whereas the second embodiment light module 46 is configured to provide illumination during substantially the full cycle of the source current, thus providing a brighter appearance. In addition to illumination during substantially the full cycle of the source current, which will result in the light module 46 appearing brighter, light module 46 has further the advantage of generating less electromagnetic interference. Because the current flowing through light module 46 is substantially a full sinusoid, it will contain lower levels of higher order harmonics, which can cause coupled wires to act as an as antenna propagating electromagnetic waves with frequencies corresponding to these higher harmonics.

It is further desirable that the first embodiment light module 25 and the second embodiment light module 46 each also includes a light-diffuser 27 covering its respective LEDs 22, 23, 42, 43, 44, 45. Each respective light-diffuser 27, 47 is configured to diffuse the light emitted by the respective LEDs 22, 23, 42, 43, 44, 45 such that an observer of the respective light module 25, 46 will be unable to readily distinguish which of the LEDs is the source of the light from the light module 25, 46 or in what relative proportions.

Figure 3:
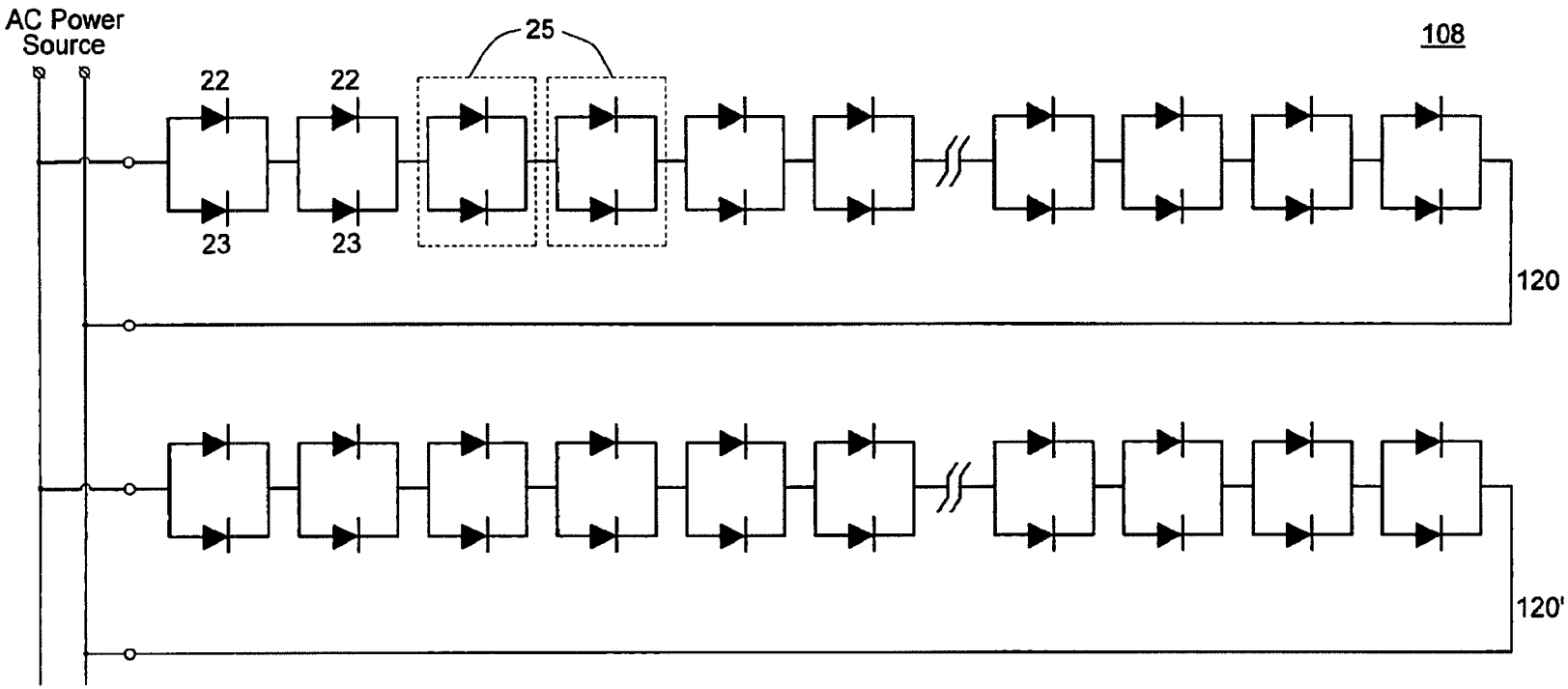
FIG. 3 is a schematic diagram of a light string according to a third embodiment of the invention.

FIG. 3 shows a light string according to a third embodiment of the invention, generally illustrated at 108. The light string 108 includes a block 120 of light modules 25 connected in series, all with the same polarity. The light string 108 may include more than one block 120 of light modules 25, as is the case with this third embodiment, which includes a second parallel block 120' of light modules 25.

If an LED, for example one of the pair of LEDs 22, 23 in a particular light module 25, fails open, then the remaining one of the pair of LEDs 23, 22 will carry all of the current flowing through that light module 25, and therefore that light module 25 as a whole will continue to provide light and conduct current and therefore the whole block 120 will continue to provide light and conduct current.

Figure 4:
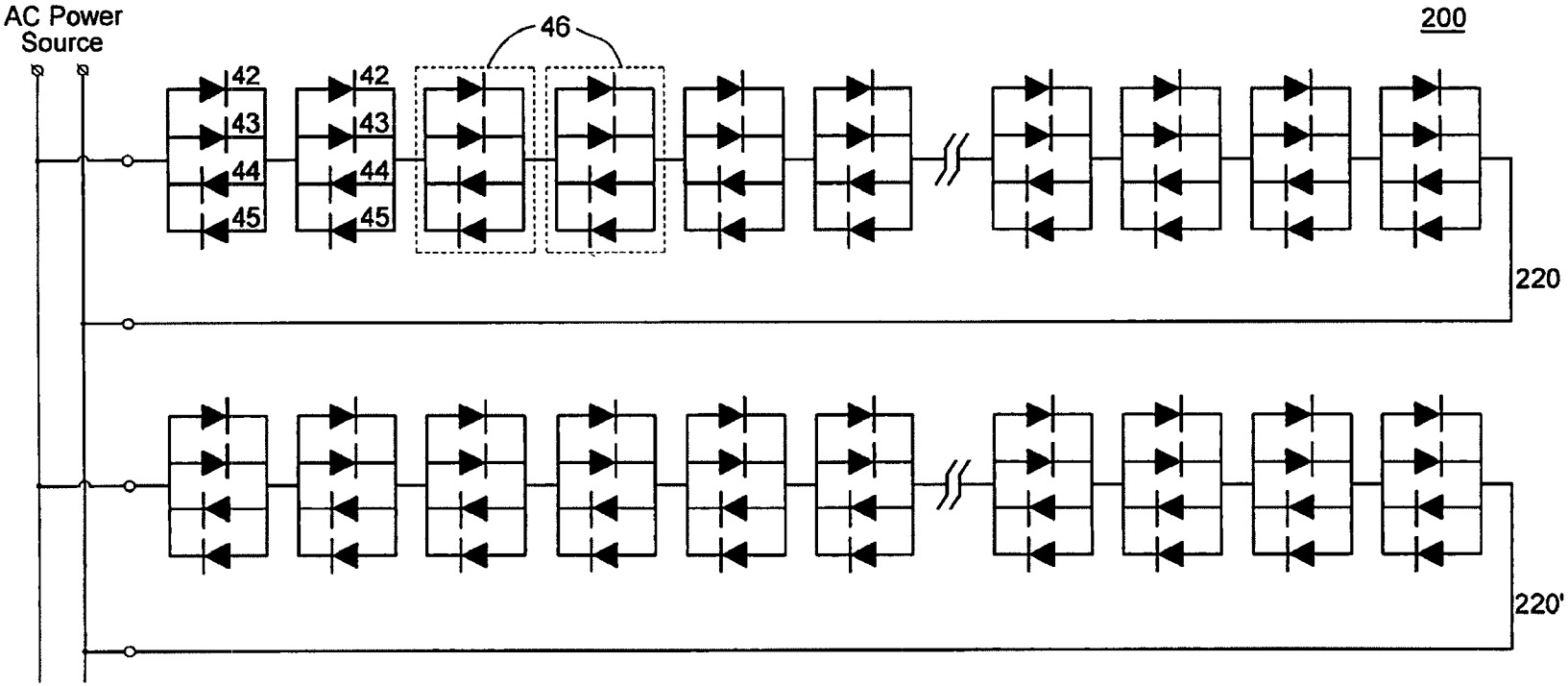
FIG. 4 is a schematic diagram of a light string according to a fourth embodiment of the invention.

FIG. 4 shows a light string according to a fourth embodiment of the invention, generally illustrated at 200. The light string 200 includes a block 220 of light modules 46 connected in series. The light string 200 may be more than one block 220 of light modules 46, as is the case with this fourth embodiment, which includes a second parallel block 220' of light modules 46.

The light string 108, 200 may be configured to connect directly to a source of household alternating current ("AC"). In this configuration, the number of light modules 25, 46 in each block 120, 220 must be selected such that the sum of the minimum operating voltage for each of the light modules 25, 46 is less than or equal to the voltage of the available supply and that the sum of the maximum operating voltage for each of the light modules 25, 46 is greater than or equal to the voltage of the available supply. The minimum and maximum operating voltages of the light modules 25, 46 is essentially the minimum and maximum operating voltages of the respective pairs of LEDs 22, 23, 42, 43, 44, 45.

For example, assume that all the light modules 25, 46 in the block 120, 220 are identical and that all the pairs of LEDs 22, 23, 42, 43, 44, 45, have a forward AC voltage operating range of 1.5 $V_{AC}$ to 2.5 $V_{AC}$ and a corresponding current range of 10 mA to 50 mA. If the AC supply voltage is 110 $V_{AC}$, then with 50 light modules 25, 46 in the block 120,220 the voltage drop across each light module 25, 46 will be approximately 2.2 $V_{AC}$, which is well within the operating range of each light module 25, 46 and the respective pairs of LEDs 22, 23, 42, 43, 44, 45.

Figure 5:
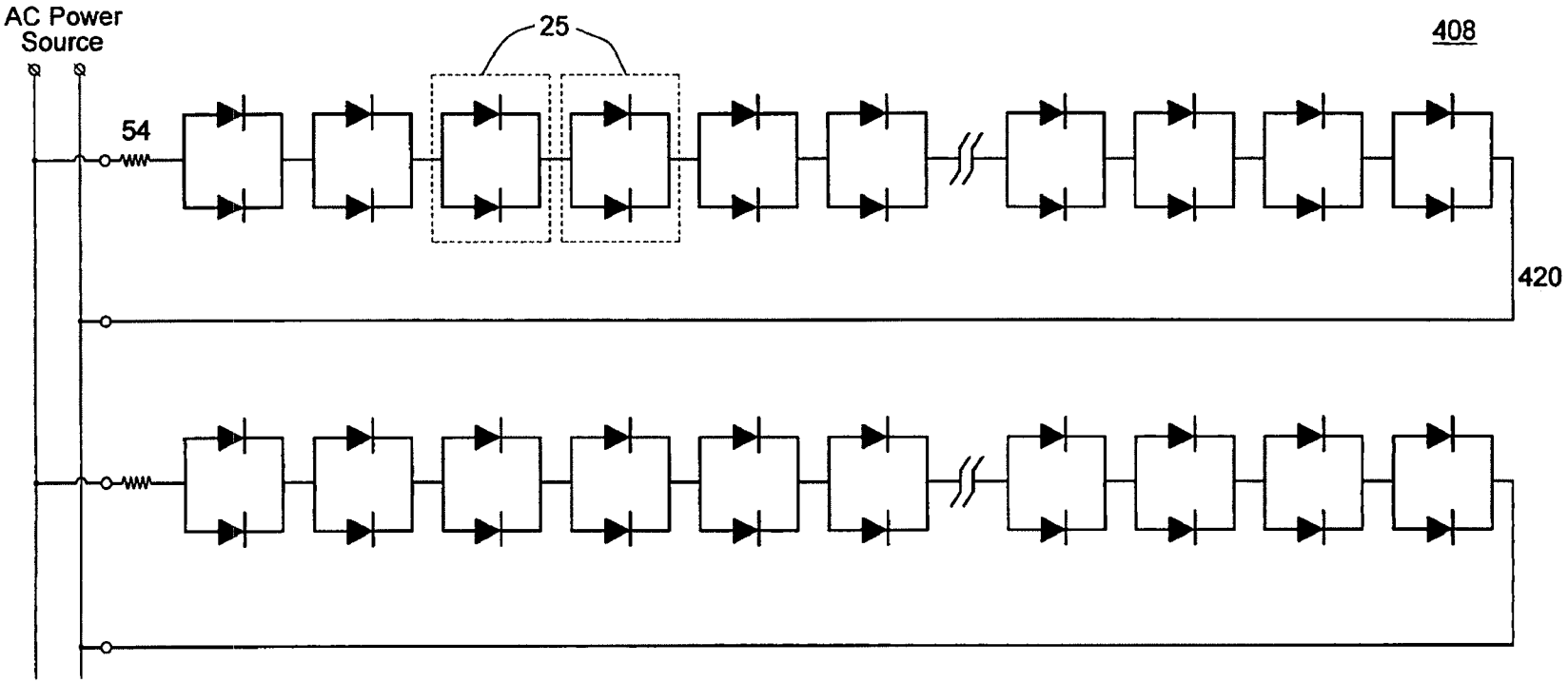
FIG. 5 is a schematic diagram of a light string according to a fifth embodiment of the invention.

FIG. 5 shows a light string according to a fifth embodiment of the invention, generally illustrated at 408. The light string 408 includes at least one block 420 of light modules 25 connected in series. The light string 408 further includes a resistor 54 connected in series with the block 420. The value of resistor 54 may be selected to provide current-limiting in the event of a short circuit in block 420 and to produce during regular operation of the block 420 a voltage drop sufficient to replace one or more light modules 25 if less modules are desired in block 420 than would be required as discussed above with respect to the third and fourth embodiment blocks 120, 200. Those skilled in the art will appreciate that, besides a resistor, other means may be used to limit the current in block 420 or produce a voltage drop equivalent to one or more light modules 25 in series.

Figure 6:
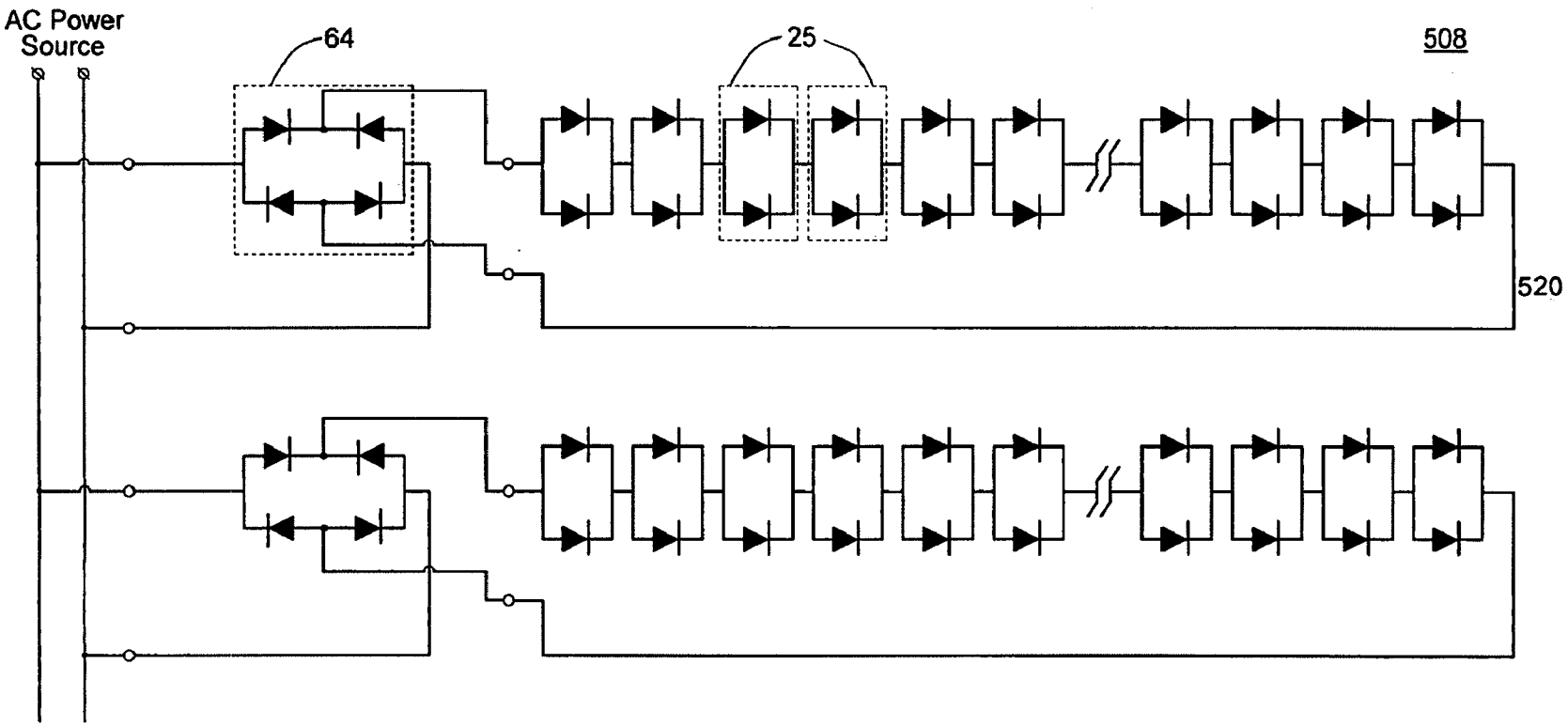
FIG. 6 is a schematic diagram of a light string according to a sixth embodiment of the invention.

FIG. 6 shows a light string according to a sixth embodiment of the invention, generally illustrated at 508. The light string 508 includes at least one block 520 of light modules 25 connected in series. The light string 508 further includes a full-wave rectifier 64 coupled to the block 520. This embodiment of the light string 508 is configured to provide current to each light module 25 over the entire AC cycle, such that each light module 25 will appear brighter and steadier.

While not shown in FIG. 6, those skilled in the art will appreciate that means for smoothing the ripple in the output of the rectifier 64 may also be coupled to rectifier 64. For example, an inductor may be placed in series between the rectifier 64 and the light modules 25 in the block 520, or a capacitor may be placed in series with the rectifier 64 and in parallel with light modules 25 to smooth the ripple.

Figure 7:
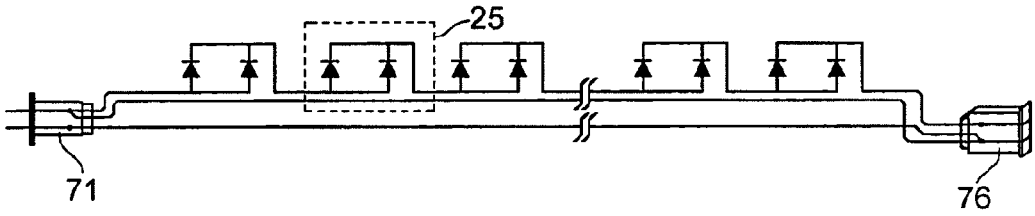
FIG. 7 is a wiring schematic of a light string according to a seventh embodiment of the invention.
Figure 8:
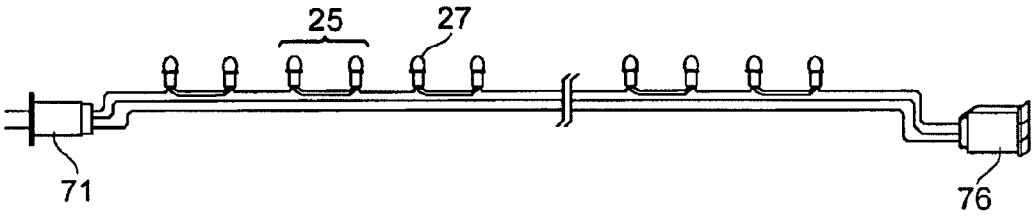
FIG. 8 is a pictorial view of the light string illustrated in FIG. 7.

FIGS. 7 and 8 show a light string according to a seventh embodiment of the invention, generally illustrated at 608. The seventh embodiment light string 608 is similar to the third embodiment light string 108, except that it includes only a single block 620 of light modules 25 connected in series.

The light string 608 further includes a plug 71 attached in series to one end of the light string 608, adapted to connect the light string 608 to a source of AC. The light string 608 also includes a receptacle 76 attached in series to the other end of light string 608, adapted for connecting the light string 608 to another appliance (not shown) that requires AC, for example another light string 608. The plug 71 and receptacle 76 are connected together in parallel to the light string 608, so that an open circuit in the light string 608 will not interrupt the AC being provided to the other appliance (not shown).

While specific embodiments of the invention have been described and illustrated, such embodiments should be considered illustrative of the invention only and not as limiting the invention as construed in accordance with the accompanying claims.

It will be understood by those skilled in the art that various changes, modifications and substitutions can be made to the foregoing embodiments without departing from the principle and scope of the invention expressed in the claims made herein. For example, although the invention has been discussed in terms of light emitting diodes, those skilled in the art may recognize that similar benefits could be achieved by substituting other similar polarized photon-emitting semiconductor devices, such as light emitting transistors.

While the invention has been described as having particular application for decorative lighting, and in particular Christmas lighting, those skilled in the art will recognize it has wider application, for example in optical communications.

What is claimed is:

1. An apparatus, comprising:

a *plurality of* light [module,] *modules connected in series to form at least a portion of a light string that is driven by an alternating power source, said light modules* comprising:

a first light emitting diode having a first set of electrical characteristics *comprising a first forward voltage drop*; and a second light emitting diode connected *directly* to said first light emitting diode in parallel such that said first light emitting diode and said second light emitting diode have the same polarity, said second light emitting diode [having] *selected to have* a second set of electrical characteristics *comprising a second forward voltage drop* that are different from said first set of electrical characteristics, such that said first light emitting diode carries substantially all of the current that is conducted through said light module, while said second light emitting diode remains unused until said first light emitting diode fails to conduct said current, *wherein each of said first light emitting diode and said second light emitting diode have a total current rating sufficient to carry all of said current conducted through said light module*.

2. An apparatus [as claimed in claim 1,] *comprising:*

*a plurality of light modules that are connected in series to form at least a portion of a light string that is driven by an alternating power source, said light modules comprising:*

*a first light emitting diode having a first set of electrical characteristics comprising a first forward voltage drop; and*

*a second light emitting diode connected directly to said first light emitting diode in parallel such that said first light emitting diode and said second light emitting diode have the same polarity, said second light emitting diode having a second set of electrical characteristics, comprising a second forward voltage drop, that are selected to be substantially similar to said first set of electrical characteristics, comprising said first voltage drop, such that said first light emitting diode and said second light emitting diode carry a substantially equal amount of the current that is conducted through said light module,* wherein [at least one of] *each of* said first light emitting diode and said second light emitting diode [has] *have* a maximum total current rating sufficient to carry all of said current conducted through said light module [but] *and* are not selected to have different electrical characteristics.

3. An apparatus as claimed in claim 2, further comprising a light-diffuser covering said first and said second light emitting diodes.

4. An apparatus as claimed in claim 2, wherein said light module further comprises:

a third light emitting diode that is connected to said first and said second light emitting diodes, in parallel, but with opposite polarity; and a fourth light emitting diode that is connected to said first and said second light emitting diodes, in parallel, but with opposite polarity.

5. An apparatus as claimed in claim 2, wherein said first and said second light emitting diodes have substantially the same forward voltage drop over the operating range of said light module.

6. An apparatus as claimed in claim 5, further comprising a heat sink thermally connected to both said first and said second light emitting diodes.

[7. An apparatus as claimed in claim 1, further comprising a plurality of additional light modules as claimed in claim 1, connected together in series and connected to said light module in series.]

8. An apparatus as claimed in claim [7] *1*, wherein the number of said plurality of [additional] light modules [and said light module] that are connected together in series is selected such that the sum of the minimum operating voltage of each of said plurality of [additional light modules and] said light modules is less than or equal to the voltage available to supply said apparatus.

9. An apparatus as claimed in claim 8, wherein the minimum operating voltage of a light module is the greater of the minimum operating voltage of said first light emitting diode and the minimum operating voltage of said second light emitting diode.

10. An apparatus as claimed in claim 8, wherein said number of light modules that are connected together in series is selected such that the sum of the maximum operating voltage for each of the light modules is greater than or equal to said voltage available to supply said apparatus.

11. An apparatus as claimed in claim 10, wherein the maximum operating voltage of a light module is the lesser of the maximum operating voltage of said first light emitting diode and the maximum operating voltage of said second light emitting diode.

12. An apparatus as claimed in claim 10, further comprising means for limiting said current flowing through to light module.

13. An apparatus as claimed in claim 12, wherein said means for limiting current comprises a resistor connected in series with said light module.

14. An apparatus, comprising:

a *plurality of* light [module,] *modules that form at least a portion of a light string that is driven by an alternating power source, said light modules* comprising:

a first polarized photon-emitting semiconductor device having a first set of electrical characteristics *comprising a first forward voltage drop*; and a second photon-emitting semiconductor device connected *directly* to said first photon-emitting semiconductor device in parallel such that said first polarized photon-emitting semiconductor device and said second polarized photon-emitting semi-conductor device have the same polarity, said second polarized photon-emitting semiconductor having a second set of electrical characteristics *comprising a second forward voltage drop* that are different from said first set of electrical characteristics, such that said first polarized photon-emitting semiconductor device carries all of the current that is conducted through said light module, while said second polarized photon-emitting semiconductor device remains unused until said first polarized photon-emitting semiconductor device fails to conduct said current, *wherein each of said first polarized photon-emitting semiconductor device and said second photon-emitting semiconductor device have a total current rating sufficient to carry all of said current conducted through said light module*.

[15. An apparatus as claimed in claim 14, wherein at least one of said first photon-emitting semiconductor device and said second photon-emitting semiconductor device has a maximum total current rating sufficient to carry all current conducted through said light nodule, but are not selected to have different electrical characteristics.]

16. An apparatus as claimed in claim [15] *14*, wherein said first and said second photon-emitting semiconductor device have substantially the same forward voltage drop over the operating range of said light module.

17. A method of forming *at least a portion of* a *light string from a plurality of* light [module] *modules that are connected together in series,* comprising:

providing a first light emitting diode that has a first set of electrical characteristics *comprising a first forward voltage drop*; and connecting a second light emitting diode *directly* to said first light emitting diode in parallel *to form said light module,* such that said first light emitting diode and said second light emitting diode have the same polarity, said second light emitting diode having a second set of electrical characteristics *comprising a second forward voltage drop* that are different from said first set of electrical characteristics, such that said first light emitting diode carries substantially all of the current that is conducted through said light module, while said second light emitting diode remains unused until said first light emitting diode fails to conduct said current*, wherein each of said first light emitting diode and said second light emitting diode have a total current rating sufficient to carry all of said current conducted through said light module*.

[18. The method of claim 17 wherein at least one of said first light emitting diode and said second light emitting diode have a maximum total current rating sufficient to carry all current conducted through said module, but are not selected to have different electrical characteristics.]

* * * * *